(12) United States Patent
Gassho et al.

(10) Patent No.: US 7,450,259 B2
(45) Date of Patent: Nov. 11, 2008

(54) LOG TRANSMISSION DEVICE AND LOG TRANSMISSION METHOD

(75) Inventors: Kazuhito Gassho, Nagano-ken (JP);
Teruhito Kojima, Nagano-ken (JP);
Miguel Canas, Barcelona (ES)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 10/792,296

(22) Filed: Mar. 4, 2004

(65) Prior Publication Data
US 2004/0233472 A1  Nov. 25, 2004

(30) Foreign Application Priority Data
Mar. 10, 2003  (JP) ............................. 2003-063583

(51) Int. Cl.
*G06F 3/12*  (2006.01)

(52) U.S. Cl. ..................................... 358/1.15; 358/1.13

(58) Field of Classification Search ........... 358/1.1–1.9, 358/1.11–1.18; 700/223
See application file for complete search history.

(56) References Cited

U.S. PATENT DOCUMENTS

| | | | |
|---|---|---|---|
| 2002/0138612 A1 | 9/2002 | Sekizawa | |
| 2002/0188646 A1 | 12/2002 | Terrill et al. | |
| 2004/0156064 A1* | 8/2004 | Owen et al. | 358/1.13 |

FOREIGN PATENT DOCUMENTS

| | | | |
|---|---|---|---|
| JP | 2001-243091 A | 9/2001 |
| JP | 2003-015855 A | 1/2003 |

OTHER PUBLICATIONS

Patent Abstracts of Japan, vol. 2000, No. 08, Oct. 6, 2000, & JP 2000 132347 A (Ricoh Co. Ltd.) May 12, 2000).

* cited by examiner

*Primary Examiner*—King Poon
*Assistant Examiner*—Lennin R Rodriguez
(74) *Attorney, Agent, or Firm*—Sughrue Mion, PLLC

(57) ABSTRACT

The network printer 30 stores print logs generated after a previous log transmission timing into the log storage area 32*b*, and then sends the print logs stored in the log storage area 32*b* to the management server 10 at a next log transmission timing. The network printer 30 stores a log relating to a print job into the log storage area 32*b* on completion of the whole print job when the next job transmission timing does not come before completion of the print job, while storing a log relating to a print job into the log storage area 32*b* on completion of every one page included in the print job when the next job transmission timing comes before completion of the print job. This arrangement desirably ensures transmission of logs relating to all jobs generated before each transmission timing to the management server.

8 Claims, 9 Drawing Sheets

Fig. 5

Print Log A

| Print Job ID | A |
|---|---|
| Work Time | 10/02/03 9:30~9:35 |
| Document Name | File 'a' |
| Paper Size | B4 |
| Number of Printed Sheets | |

Print Log B

| Print Job ID | B |
|---|---|
| Work Time | 10/02/03 13:00~13:15 |
| Document Name | File 'c' |
| Paper Size | A4 |
| Number of Printed Sheets | |

Print Log C1

| Print Job ID | C |
|---|---|
| Work Time | 10/02/03 16:56~16:57 |
| Document Name | File 'c' |
| Paper Size | A4 |
| Number of Printed Sheets | |

Print Log C2

| Print Job ID | C |
|---|---|
| Work Time | 10/02/03 16:57~16:58 |
| Document Name | File 'c' |
| Paper Size | A4 |
| Number of Printed Sheets | |

Print Log C3

| Print Job ID | C |
|---|---|
| Work Time | 10/02/03 16:58~16:59 |
| Document Name | File 'c' |
| Paper Size | A4 |
| Number of Printed Sheets | 1 |
| ⋮ | ⋮ |

Fig. 7

Table 50 Representing Information on Working Status

| MAC Address | ~51 |
| Number of Printed Sheets (Size B5) | |
| Number of Printed Sheets (Size A4) | }52 |
| ⋮ | |
| Consumption of Toner (C) | |
| Consumption of Toner (M) | }53 |
| Consumption of Toner (Y) | |
| Consumption of Toner (K) | |
| Error Time | ~54 |
| ⋮ | |

Fig. 9    (Prior Art)
(a)
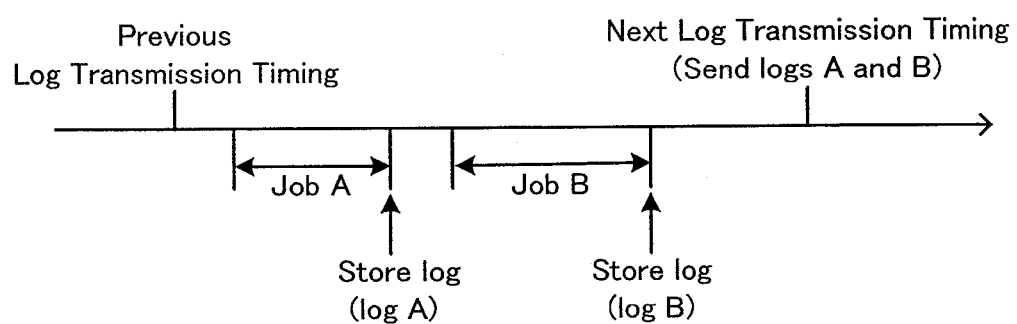
(b)
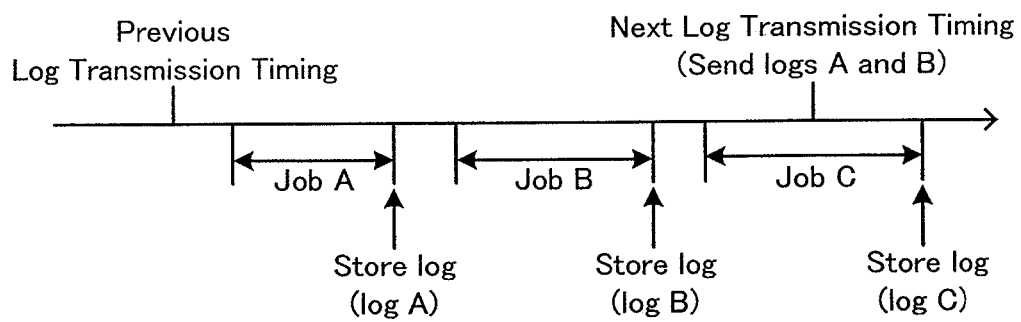

LOG TRANSMISSION DEVICE AND LOG TRANSMISSION METHOD

BACKGROUND OF THE INVENTION

1. Field of the Invention

The present invention relates to a log transmission device and a log transmission method. More specifically, the invention relates to a log transmission device that transmits a log to a management server at every preset log transmission timing, and a corresponding method.

2. Description of the Prior Art

Diverse methods have been proposed to use logs in a computer network environment. For example, an office equipment maintenance system utilizing logs is disclosed in Patent Laid-Open Gazette No. 2001-243091. In this cited reference, each office machine connecting with a service center via a network accumulates multiple log files into a hard disk. These log files include logs generated on the same date. When these log files are sent from the office machine to the service center, the service center analyzes the received log files and remotely diagnoses the office machine.

In one practical example, logs may be sent from each office machine to a management server at every preset log transmission timing. In this case, a log transmission timing may come in the course of execution of a job. One available technique sends logs relating to only the jobs completed before a log transmission timing to the management server. With regard to a job under execution, a log relating to the job is updated on completion of the job and is sent to the management server at a next log transmission timing. As shown in an example of FIG. 9(a), logs A and B relating to jobs A and B, which are generated after a previous log transmission timing, are stored on completion of the respective jobs A and B and are sent to the management server at a next log transmission timing.

In an illustrated example of FIG. 9(b), a job C is started immediately before the next log transmission timing but is completed after the next log transmission timing. In this case, although part of the job C is processed before the next log transmission timing, completion of the whole job C is after the next log transmission timing. A log C relating to the job C is accordingly sent to the management server at a log transmission timing after the next. Namely no log relating to this job C has been sent at the next log transmission timing, regardless of completion of part of the job C prior to the next log transmission timing. Such a delay of transmission of the log may lower the accuracy of a certain judgment or decision based on the log.

SUMMARY OF THE INVENTION

By taking into account the drawbacks of the prior art technique discussed above, the object of the invention is to provide a log transmission device and a log transmission method that ensures transmission of logs relating to all the jobs generated before each transmission timing to the management server without any delay. The object of the invention is also to provide a log transmission device and a corresponding method that enables a management server to manage printers adequately based on the logs received from the log transmission device.

In order to achieve at least a part of the above objects, a log transmission and a log transmission method are constructed as follows.

A log transmission device of the present invention is a device that transmits a log to a management server at every preset log transmission timing, the log transmission device including: a log storage control module that stores a log generated after a previous log transmission timing into a log storage module; a log transmission timing specification module that determines whether a current time is a log transmission timing; and a log transmission control module that, when the log transmission timing specification module determines that the current time is a log transmission timing, sends the log stored in the log storage module to the management server, and the log storage control module divides a job into multiple sections and stores a log relating to the job into the log storage module on completion of every one divisional section of the job, when a predetermined job division condition is fulfilled.

The log transmission device of the invention sends logs stored in the log storage module, that is, logs generated after a previous log transmission timing, to the management server at a next log transmission timing. When a predetermined job division condition is fulfilled, a log relating to a job, which is divided into multiple sections, is stored into the log storage module on completion of every one divisional section. Logs relating to completed jobs and logs relating to completed divisional sections of the job, which are stored in the log storage module before the next log transmission timing, are accordingly sent to the management server at the next log transmission timing. Logs relating to the remaining divisional sections of the job, which are stored in the log storage module after the next log transmission timing, are sent to the management server at a log transmission timing after the next. This arrangement desirably ensures transmission of logs relating to all the jobs generated before each transmission timing to the management server without any delay.

In one preferable application of the present invention, the log storage control module stores a log relating to a job into the log storage module on completion of the whole job when a next job transmission timing does not come before completion of the job, while dividing a job into multiple sections and storing a log relating to the job into the log storage module on completion of every one divisional section of the job when the next job transmission timing comes before completion of the job. When the next log transmission timing does not come before completion of a job, a log relating to the job is stored into the log storage module on completion of the whole job and is sent to the management server at a next log transmission timing. When the next log transmission timing comes before completion of a job, on the other hand, the method of storing a log relating to the job on completion of the whole job causes the log to be sent to the management server at a log transmission timing after the next. This undesirably delays transmission of the log. The technique of the invention, however, divides the job into multiple sections and stores a log relating to the job into the log storage module on completion of every one divisional section of the job. Logs relating to completed divisional sections of the job, which are stored in the log storage module before the next log transmission timing, are accordingly sent to the management server at the next log transmission timing. Logs relating to the remaining divisional sections of the job, which are stored in the log storage module after the next log transmission timing, are sent to the management server at a log transmission timing after the next. This arrangement desirably ensures transmission of logs relating to all the jobs generated before each transmission timing to the management server without any delay.

As one modification of the above application, the log storage control module determines whether an expected end time of a job estimated according to contents of the job comes to or after the next log transmission timing, in order to determine whether the next job transmission timing comes before completion of the job. In case of a print job, a volume of print data, a paper size or a number of pages to be printed may be used as contents of the job. As another modification of the application, the log storage control module determines whether an execution start time of a job is within a preset approaching range, which is close to the next log transmission timing, in order to determine whether the next job transmission timing comes before completion of the job. As another modification of the application.

In another preferable application of the invention, the log storage control module stores a log relating to a print job into the log storage module on completion of every one page included in the print job when the next job transmission timing comes before completion of the print job.

The log transmission device of the invention may be mounted on a network printer, or a network computer that outputs a printing instruction to a printer.

In the log transmission device of the invention, the log may include job identification information for identifying a job related to the log.

In the log transmission device of the invention, the log transmission control module may send the log to a management server, which evaluates validity of a contract made by a dealer with a registered user to permit the use of multiple apparatuses with the log transmission device mounted thereon for a predetermined time period at a flat rate.

A log transmission method of the present invention is a method that transmits a log to a management server at every preset log transmission timing, the log transmission method including the steps of: (a) storing a log generated after a previous log transmission timing into a log storage module; (b) determining whether a current time is a log transmission timing; and (c) sending the log stored in the log storage module to the management server, when it is determined in step (b) that the current time is a log transmission timing, and the step (a) divides a job into multiple sections and stores a log relating to the job into the log storage module on completion of every one divisional section of the job, when a predetermined job division condition is fulfilled.

The log transmission method of the invention sends logs stored in the log storage module, that is, logs generated after a previous log transmission timing, to the management server at a next log transmission timing. When a predetermined job division condition is fulfilled, a log relating to a job, which is divided into multiple sections, is stored into the log storage module on completion of every one divisional section. Logs relating to completed jobs and logs relating to completed divisional sections of the job, which are stored in the log storage module before the next log transmission timing, are accordingly sent to the management server at the next log transmission timing. Logs relating to the remaining divisional sections of the job, which are stored in the log storage module after the next log transmission timing, are sent to the management server at a log transmission timing after the next. This arrangement desirably ensures transmission of logs relating to all the jobs generated before each transmission timing to the management server without any delay.

In one preferable application of the invention, the step (a) stores a log relating to a job into the log storage module on completion of the whole job when a next job transmission timing does not come before completion of the job, while dividing a job into multiple sections and storing a log relating to the job into the log storage module on completion of every one divisional section of the job when the next job transmission timing comes before completion of the job.

The log transmission method of the invention sends logs stored in the log storage module, that is, logs generated after a previous log transmission timing, to the management server at a next log transmission timing. When the next log transmission timing does not come before completion of a job, a log relating to the job is stored into the log storage module on completion of the whole job and is sent to the management server at a next log transmission timing. When the next log transmission timing comes before completion of a job, on the other hand, the method of storing a log relating to the job on completion of the whole job causes the log to be sent to the management server at a log transmission timing after the next. This undesirably delays transmission of the log. The technique of the invention, however, divides the job into multiple sections and stores a log relating to the job into the log storage module on completion of every one divisional section of the job. Logs relating to completed divisional sections of the job, which are stored in the log storage module before the next log transmission timing, are accordingly sent to the management server at the next log transmission timing. Logs relating to the remaining divisional sections of the job, which are stored in the log storage module after the next log transmission timing, are sent to the management server at a log transmission timing after the next. This arrangement desirably ensures transmission of logs relating to all the jobs generated before each transmission timing to the management server without any delay.

As one modification of the above application, the step (a) determines whether an expected end time of a job estimated according to contents of the job comes to or after the next log transmission timing, in order to determine whether the next job transmission timing comes before completion of the job. As another modification of the application, the step (a) determines whether an execution start time of a job is within a preset approaching range, which is close to the next log transmission timing, in order to determine whether the next job transmission timing comes before completion of the job. As still another modification of the application, the step (a) stores a log relating to a print job into the log storage module on completion of the whole print job when a next job transmission timing does not come before completion of the print job, while storing a log relating to a print job into the log storage module on completion of every one page included in the print job when the next job transmission timing comes before completion of the print job. In the log transmission method of the invention, the log may include job identification information for identifying a job related to the log.

The technique of the present invention is also applicable to a computer program that causes a computer to execute respective steps of a log transmission method. The computer program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. Causing a computer to execute the program makes the computer executes respective steps of the log transmission method and accordingly exerts the equivalent effects to those discussed above. In the computer of the invention, only a single computer may execute all the procedures or multiple computers may share execution of the procedures.

BRIEF DESCRIPTION OF THE DRAWINGS

FIG. 5 shows print logs stored in a log storage area;

FIG. 7 is a table including the information on the working status stored in the HDD;

FIG. 9 is a time chart showing log storage timings and log transmission timings.

DESCRIPTION OF THE PREFERRED EMBODIMENTS

Figure 1:
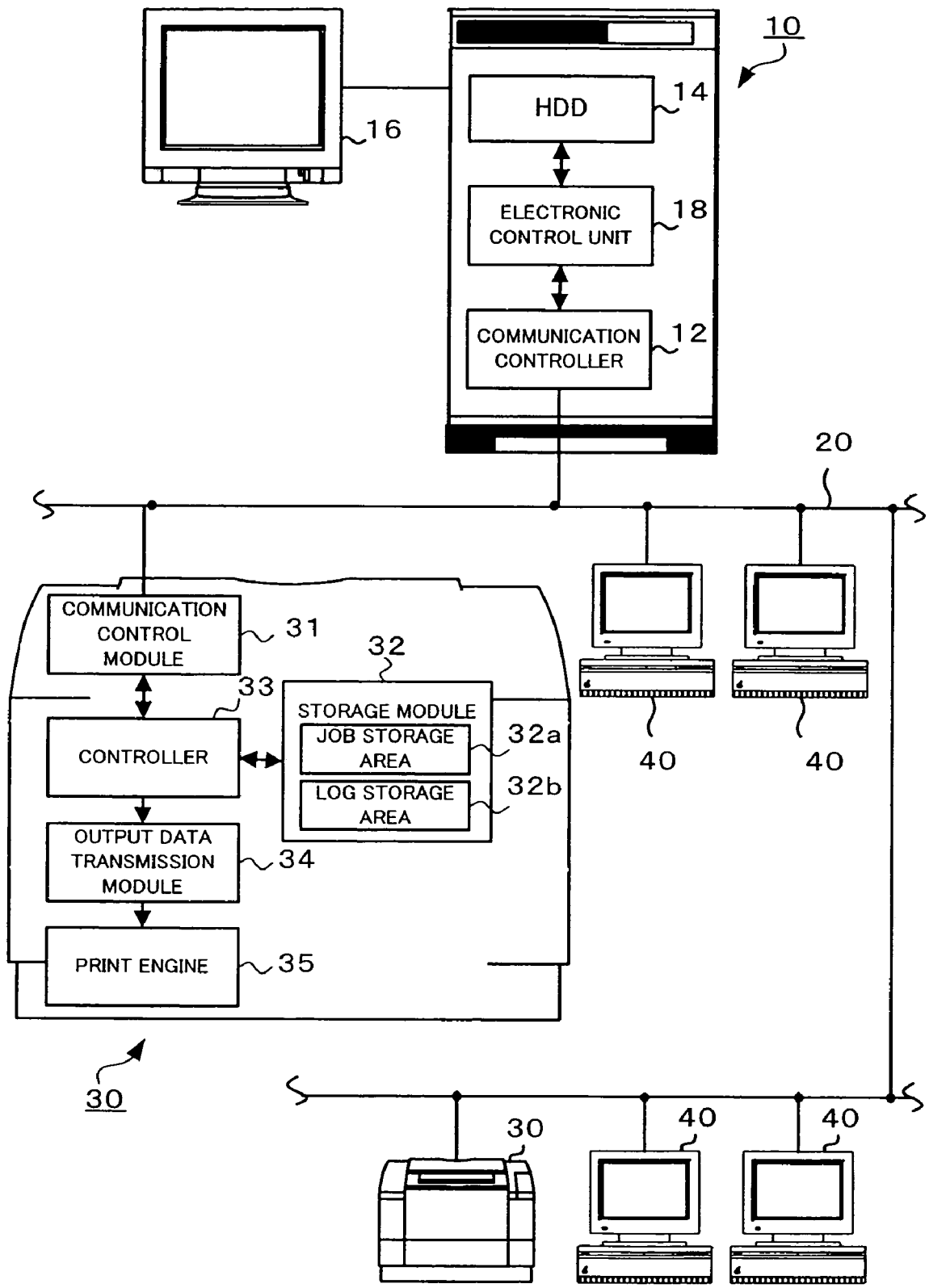
FIG. 1 is a block diagram schematically illustrating the configuration of a network system.

One mode of carrying out the invention is discussed below with reference to the accompanied drawings. FIG. 1 is a block diagram schematically illustrating the configuration of a network system including network printers 30 as apparatuses equipped with a log transmission device mounted thereon in one embodiment of the invention.

The network system of this embodiment includes a management server 10 that evaluates the validity of each printer contract made by a printer manufacturer (dealer) with each registered user to permit the use of several thousand network printers 30, 30, . . . for one year at a flat rate, the network printers 30, 30, . . . connecting with the management server 10 via a local area network (LAN) 20, and network computers 40 that output printing instructions to the network printers 30 via the LAN 20.

The management server 10 includes a communication controller 12, a hard disk drive (HDD) 14, a display 16, and an electronic control unit 18. The communication controller 12 includes a LAN card and controls data transmission with IP addresses and MAC addresses to and from the network printers 30 and the network computers 40 via the LAN 20. Here IP represents Internet Protocol and MAC represents Media Access Control. The HDD 14 is a mass storage memory and stores information on working statuses of the respective network printers 30, data required for calculating annual actual use fees from the information on the working statuses, and flat rates set in the respective printer contracts, and various application programs. The display 16 is either a CRT or an LCD and shows, for example, alarm and warning displays to be given to the operator. The electronic control unit 18 has a known structure including a CPU, a ROM, and a RAM and functions to execute the various application programs stored in the HDD 14, to store the information on the working status of each network printer 30 received by the communication controller 12 into the HDD 14, and to control display on the display 16.

Each of the network printers 30 is a color laser printer with a built-in LAN card and includes a communication control module 31, a storage module 32, a controller 33, an output data transmission module 34, and a print engine 35. The communication control module 31 has the same function as that of the communication controller 12 of the management server 10 and controls data transmission to and from the management server 10 and the network computers 40 via the LAN 20. The storage module 32 has a job storage area 32a for storing print jobs received from the network computers 40 and a log storage area 32b for storing print logs relating to the respective print jobs. The controller 33 has a known structure including a CPU, a ROM, and a RAM and functions to store each print job received from one of the network printers 40 by the communication control module 31 into the job storage area 32a, to generate output data for printing based on each print job stored in the job storage area 32a, to store a print log relating to each print job into the log storage area 32b, and to send the print log stored in the log storage area 32b to the corresponding network computer 40 at every preset log transmission timing and reset the storage in the log storage area 32b. The output data transmission module 34 sends the output data generated by the controller 33 to the print engine 35. The print engine 35 receives the output data and prints an image on a sheet of printing paper according to the received output data.

Each of the network computers 40 is a computer with a built-in LAN card. In response to a printing instruction input through operations of a keyboard or a mouse (not shown), the network computer 40 activates a printer driver for the network printers 30 to convert a file of the printing instruction into data processible by the network printers 30 and outputs a resulting print job to a selected network printer 30 via the LAN 20. The print job includes specifications regarding the type and the size of printing paper and the number of pages to be printed, as well as image data processible by the network printer 30.

The following describes the operations of each network printer 30 in this embodiment and more specifically the operations according to a print processing program and a log transmission program. In this embodiment, the controller 33 of the network printer 30 receives print jobs from the network computers 40, successively stores the received print jobs in the receiving order into the job storage area 32a of the storage module 32, and sequentially makes the print jobs stored in the job storage area 32a subjected to a series of print processing in the storage order.

Figure 2:
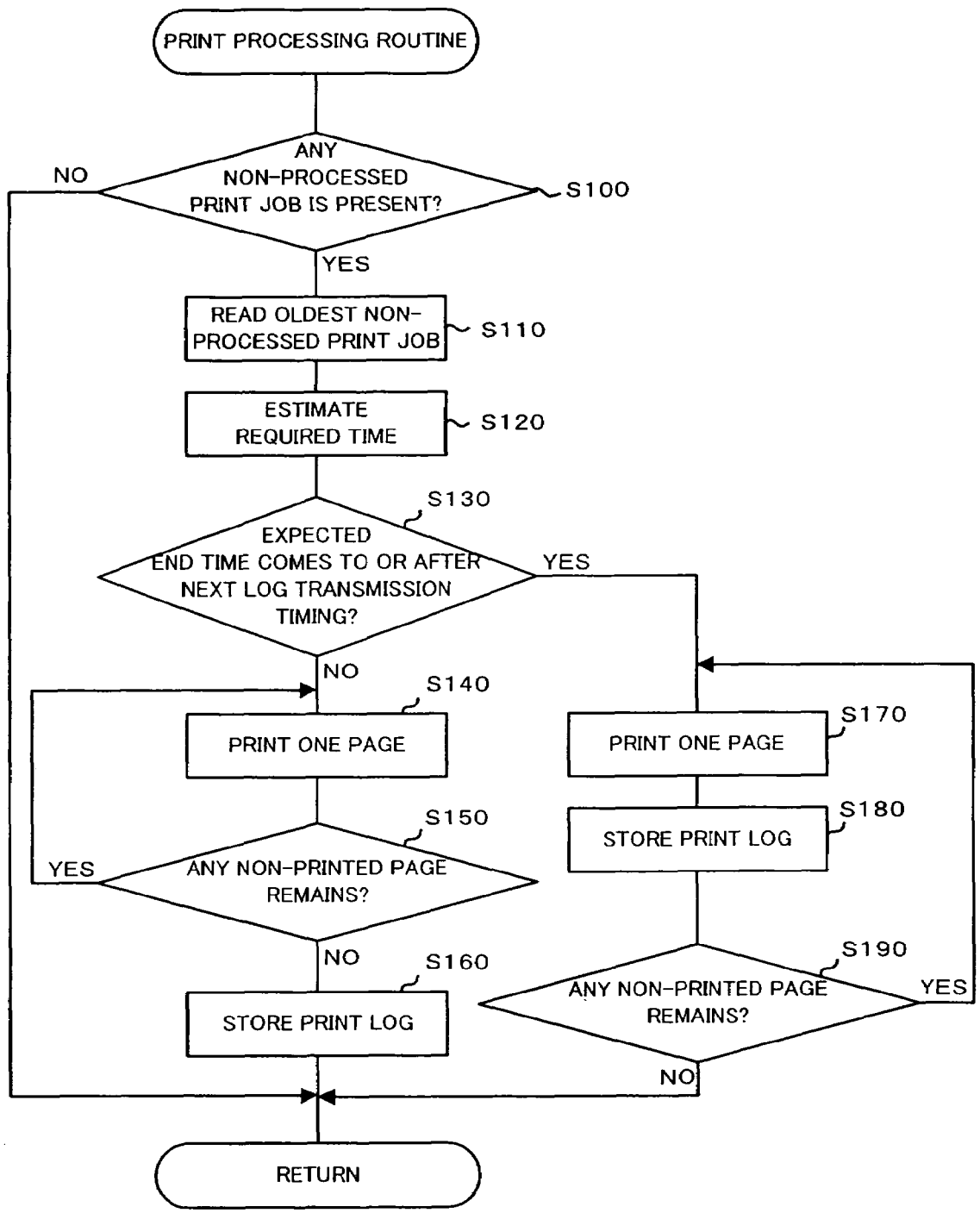
FIG. 2 is a flowchart showing the print processing program.

The controller 33 of the network printer 30 reads out and executes the print processing program stored in the ROM (not shown) at each preset timing. FIG. 2 is a flowchart showing this print processing program. When the print processing program starts, the controller 33 first determines whether any non-processed print job is included in the job storage area 32a of the storage module 32 (step S100). In the case of absence of any non-processed print job, the print processing program is terminated immediately. When there is any non-processed print job, on the other hand, the controller 33 reads out an oldest one among non-processed print jobs remaining in the job storage area 32a (step S110), and estimates a required time for completion of the print job currently read out, based on the type and the size of printing paper, the number of pages to be printed, and the volume of the image data included in the current print job (step S120). The time required for printing one page with respect to each combination of the type and the size of printing paper and the time required for printing each unit volume of image data are experimentally or empirically determined in advance, according to the capacity of the network printer 30. The processing of step S120 estimates the required time for completion of the current print job, based on these data. The controller 33 then adds the estimated required time to the current time to calculate an expected end time and determines whether the expected end time comes to or after a next log transmission timing (step S130). When the expected end time comes before the next log transmission timing, the controller 33 adopts a standard mode to store a print log on completion of all the printing for the current print job. The controller 33 causes the print engine 35 to execute printing one page included in the current print job (step S140) and determines whether the current print job still includes any page to be printed (step S150). When any non-printed page remains in the print job, the program returns to step S140 for printing a next page. When the print job has no remaining page to be printed, on the other hand, it is determined that printing of the current print job has fully been completed. The controller 33 then stores a print log relating to the current print job into the log storage area 32b (step S160) and exits from this print processing program. In the standard mode, a print log relating to each print job is stored on completion of the whole print job. In this embodiment, the print log represents information including a print job ID allocated to each print job for the purpose of identification, a work time between a work start time and a work end time, the name of a document as an object of printing, the paper size, and the number of printed sheets (see FIG. 5).

When it is determined at step S130 that the expected end time comes to or after the next log transmission timing, on the contrary, the controller 33 adopts a temporary mode to store a print log on completion of printing every one page included in the current print job. The controller 33 causes the print engine 35 to execute printing one page included in the current print job (step S170) and stores a print log relating to the current print job into the log storage area 32b on completion of printing one page (step S180). The controller 33 then determines whether the current print job still includes any page to be printed (step S190). When any non-printed page remains in the print job, the program returns to step S170 for printing a next page. When the print job has no remaining page to be printed, on the other hand, it is determined that printing of the current print job has fully been completed. The print processing program is thus terminated. In the temporary mode, a print log relating to each print job is stored on completion of printing every one page included in the print job.

Figure 3:
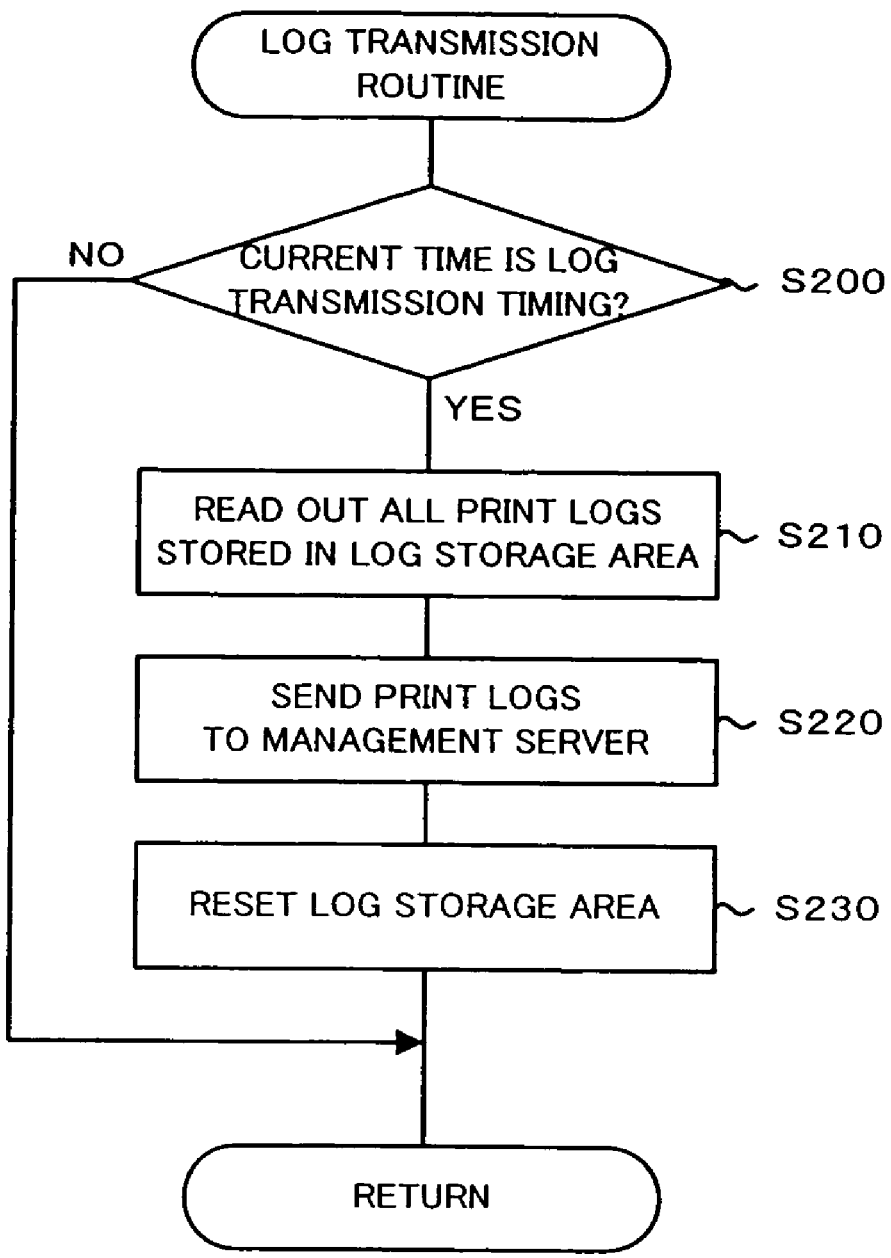
FIG. 3 is a flowchart showing the log transmission program.

The controller 33 of the network printer 30 also reads out and executes the log transmission program stored in the ROM (not shown) at each preset interrupt timing. FIG. 3 is a flowchart showing this log transmission program. When the log transmission program starts, the controller 33 first determines whether the current time is a log transmission timing (step S200). When the current time is not a log transmission timing, the log transmission program is terminated immediately. When the current time is a log transmission timing, on the other hand, the controller 33 reads out all print logs stored in the log storage area 32b (step S210) and sends the read-out print logs with other pieces of information (for example, an error time and consumptions of respective color toners) to the management server 10 (step S220). The controller 33 then resets the storage in the log storage area 32b and the storage in a storage area for the error time and the consumptions of the respective color toners (step S230) and exits from this log transmission program. The log storage area 32b and the storage area for the error time and the consumptions of the respective color toners are reset every time the logs stored in the log storage area 32b are sent to the management server 10. Namely the contents in these storage areas are those stored after a previous log transmission timing.

Figure 4:
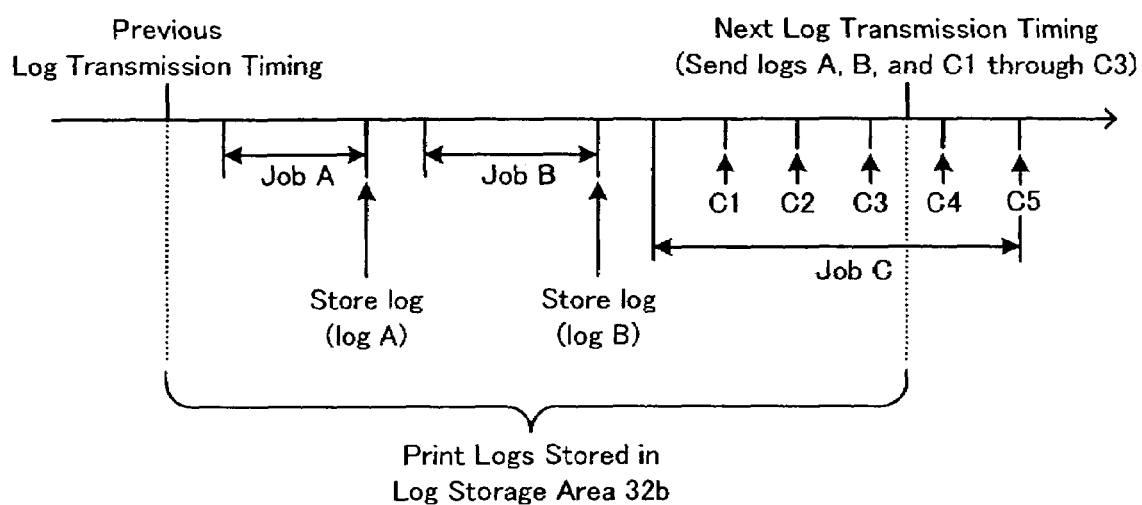
FIG. 4 is a time chart showing log storage timings and log transmission timings.

The print logs stored in the log storage area 32b of the network printer 30 are described with reference to FIGS. 4 and 5. In the illustrated example of FIG. 4, there are multiple print jobs processed during a preset time period between a previous log transmission timing and a next log transmission timing. With regard to each print job, which has been started and completed in the preset time period, among these multiple print jobs, a print log is stored on completion of the print job. In the illustrated example of FIG. 4, print logs A and B are stored respectively corresponding to such print jobs A and B. With regard to each print job, which has been started in the present time period but has not yet been completed, on the other hand, a print log is stored on completion of printing every one page as a division of the print job. In the illustrated example of FIG. 4, print logs C1 through C5 are stored corresponding to such a print job C. The print logs A, B, and C1 through C3 are stored in the log storage area 32b in the preset time period between the previous log transmission timing and the next log transmission timing. These print logs A, B, and C1 through C3 are thus sent to the management server 10 at the next log transmission timing according to the log transmission program discussed above. The remaining print logs C4 and C5 are sent to the management server 10 at a log transmission timing after the next. All the print logs C1 through C5 have an identical print job ID ('C' in the illustrated example of FIG. 5), which is allocated to the print job C. The operator can thus instantly grasp the fact that these print logs C1 through C5 are all related to the identical print job C.

The following describes the operations of the management server 10 in this embodiment and more specifically a working status acquisition process and a printer contract evaluation process.

Figure 6:
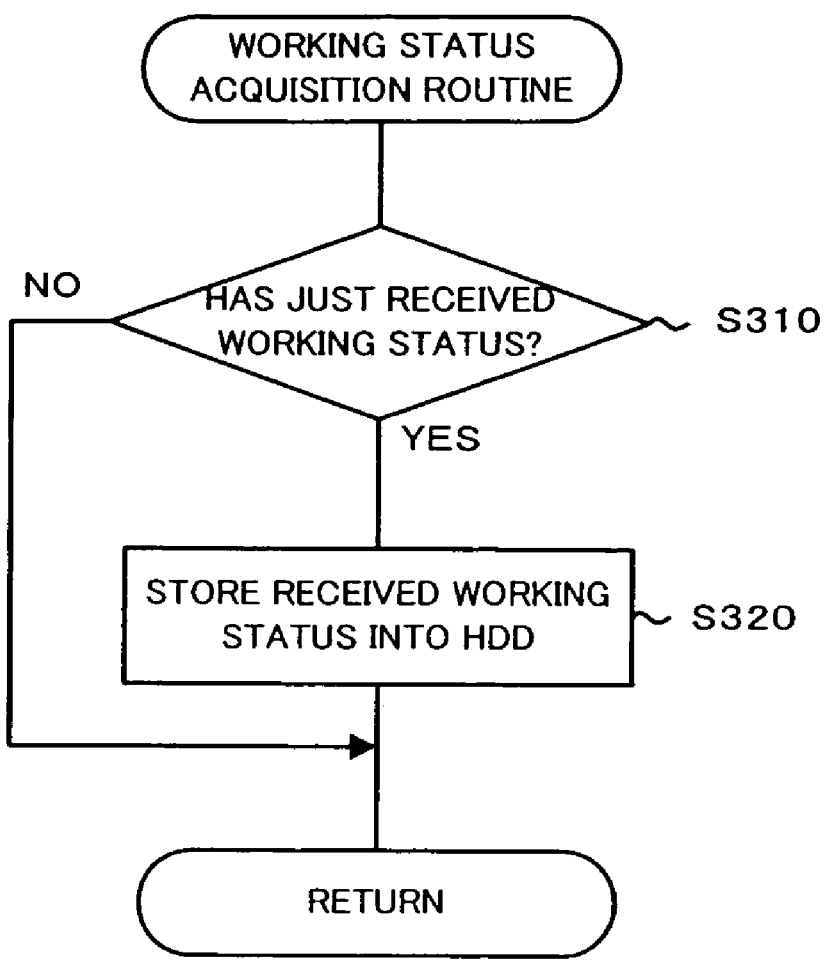
FIG. 6 is a flowchart showing the working status acquisition program.

The electronic control unit 18 of the management server 10 reads out and executes a working status acquisition program stored in the HDD 14 at every preset interval (for example, at every several msec). FIG. 6 is a flowchart showing the working status acquisition program. When this working status acquisition program starts, the electronic control unit 18 first determines whether the communication controller 12 has just received information on the working status from any of the network printers 30 via the LAN 20 (step S310). The information on the working status includes the print log discussed above and logs relating to the error time and the consumptions of the respective color toners. When the communication controller 12 has not received the information on the working status from any of the network printers 30, the working status acquisition program is terminated immediately. When the communication controller 12 has just received the information on the working status from any of the network printers 30, on the other hand, the electronic control unit 18 stores the received information into the HDD 14 (step S320) and exits from this working status acquisition program.

As a result of storage of the information on the working status into the HDD 14 at step S320, a table 50 including the information on the working status is created in the HDD 14 as shown in FIG. 7. The table 50 includes a MAC address 51 of the network printer 30 as a transmission source of the information on the working status, the numbers of sheets 52 printed by the network printer 30 with regard to the respective paper sizes in a preset time period between a previous transmission timing and a next transmission timing, consumptions of respective color toners 53 in the preset time period between the previous transmission timing and the next transmission timing, and an error time 54 occurring in the preset time period between the previous transmission timing and the next transmission timing. The MAC address is intrinsic information allocated to each LAN card as is well known in the art and is added to a header of the data transmitted via the LAN 20. In the structure of this embodiment, the LAN card is built in and is not detached from the network printer 30. The MAC address is accordingly regarded as identification information of the network printer 30. Summation of the tables 50 having the same MAC address gives the total numbers of printed sheets with regard to the respective paper sizes and total consumptions of respective color toners by the network printer 30 having the same MAC address. The terminology 'error time' represents a time period between the occurrence of an unprintable state (error state) by some trouble or failure and elimination of the error state.

Figure 8:
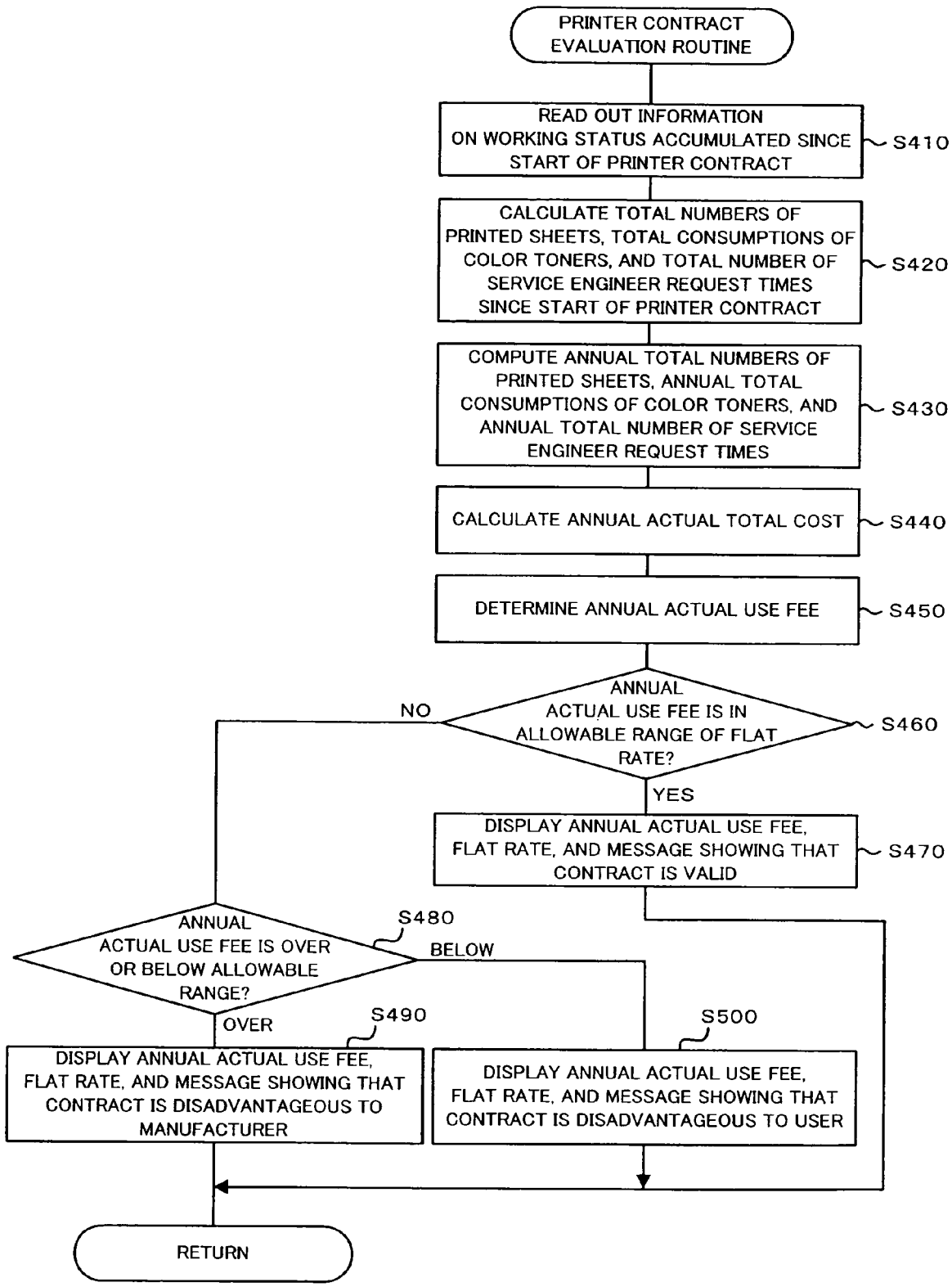
FIG. 8 is a flowchart showing the printer contract evaluation program.

The electronic control unit 18 of the management server 10 also reads out and executes a printer contract evaluation program stored in the HDD 14, in response to the operator's input of each printer contract evaluation instruction through the operations of an input unit (not shown), such as a keyboard and a mouse. FIG. 8 is a flowchart showing the printer contract evaluation program. When this printer contract evaluation program starts, the electronic control unit 18 first reads out all the information on the working status, which is related to a target printer contract as a subject of evaluation and has been accumulated in the HDD 14 since a start of the target printer contract (step S410). The electronic control unit 18 subsequently calculates the total numbers of printed sheets with regard to the respective paper sizes, the total consumptions of the respective color toners, and the total number of service engineer request times, based on the read-out information on the working status (step S420). In the structure of this embodiment, each error time that is longer than a preset time (for example, 1 hour) counts up the total number of service engineer request times. This is because the longer error time generally requires fixation by a service engineer.

The electronic control unit 18 then sets a correction coefficient by dividing 365 days (1 year) by the number of dates elapsing since the start of the printer contract and multiplies the total numbers of printed sheets with regard to the respective paper sizes, the total consumptions of the respective color toners, and the total number of service engineer request times calculated at step S420 by this correction coefficient, so as to compute the annual total numbers of printed sheets with regard to the respective paper sizes, the annual total consumptions of the respective color toners, and the annual total number of service engineer request times (step S430). The electronic control unit 18 calculates an annual actual total cost, based on the annual total numbers of printed sheets with regard to the respective paper sizes, the annual total consumptions of the respective color toners, and the annual total number of service engineer request times (step S440). The concrete procedure calculates an annual actual cost of printing papers from unit prices of the respective paper sizes and the annual total numbers of printed sheets with respect to the respective paper sizes, an annual actual cost of color toners from unit prices of the respective color toners and the annual consumptions of the respective color toners, and an annual actual cost of services by service engineers from a cost of one visit of a service engineer and the annual total number of service engineer request times, and sums up these calculated actual costs to the annual actual total cost. The electronic control unit 18 subsequently adds profits and other additional factors to the calculated annual actual total cost to determine an annual actual use fee (step S450).

The electronic control unit 18 determines whether the annual actual use fee is in an allowable range of a flat rate set in the printer contract (for example, in a range of ±X % of the flat rate) (step S460). When the annual actual use fee is in the allowable range of the flat rate, the annual actual use fee, the flat rate set in the printer contract, and a message telling that the target printer contract as the subject of evaluation is valid are shown on the display 16 (step S470). When the annual actual use fee is not in the allowable range of the flat rate set in the printer contract, on the other hand, the electronic control unit 18 determines whether the annual actual use fee is over an upper limit of the allowable range or below a lower limit of the allowable range (step S480). When the annual actual use fee is over the upper limit of the allowable range, the annual actual use fee, the flat rate set in the printer contract, and a message telling that the target printer contract as the subject of evaluation is disadvantageous to the printer manufacturer are shown on the display 16 (step S490). When the annual actual use fee is below the lower limit of the allowable range, the annual actual use fee, the flat rate set in the printer contract, and a message telling that the target printer contract as the subject of evaluation is disadvantageous to the user are shown on the display 16 (step S500). The printer contract evaluation program is terminated after the display of one of steps S470, S490, and S500. An additional message telling that a review of the current printer contract is required may be shown on the display 16 at step S490 or at step S500.

The network printer 30 of this embodiment corresponds to the apparatus equipped with the log transmission device of the invention. The log storage area 32b of the storage module 32 corresponds to the log storage module of the invention. The controller 33 corresponds to the log storage control module, the log transmission timing specification module, and the log transmission control module of the invention. The above description of the operations of the network printer 30 clearly shows one embodiment of the log transmission method of the invention, as well as one embodiment of the program of the invention that causes a computer to execute the respective steps of the log transmission method.

As described above, the network printer 30 of the embodiment switches over the log storage mode from the standard mode to the temporary mode, when a next log transmission timing comes before completion of a print job. In the standard mode, a print log relating to each print job is stored on completion of the whole print job. In the temporary mode, a print log relating to each print job is stored on completion of printing every one page included in the print job. Print logs relating to pages of a print job printed before the next log transmission timing are sent to the management server 10 at the next log transmission timing, whereas print logs relating to remaining pages of the print job printed after the next log transmission timing are sent to the management server 10 at a log transmission timing after the next. This arrangement ensures transmission of print logs relating to all the print jobs generated before each log transmission timing to the management server 10 without any delay.

The concrete procedure for determination of whether a next log transmission timing comes before completion of a print job determines whether the expected end time calculated according to the contents of the print job comes to or after the next log transmission timing. This arrangement calculates the expected end time of the print job with relatively high accuracy and thereby determines whether the next log transmission timing comes before completion of the print job with relatively high accuracy.

Each print log includes a print job ID to identify the print job as the source of the print log. Even when a print log is stored on completion of printing every one page as a division of one print job, this printer job ID enables the operator to readily grasp that multiple print logs correspond to one identical print job.

The management server 10 of the embodiment adequately evaluates the validity of the flat rate set in each printer contract, based on the received print logs and other required information. When the user uses multiple network printers 30, these network printers 30 generally have different working statuses. The management server 10 sums up the information on the working statuses of the respective network printers 30 to determine the annual actual total cost. This arrangement determines the annual actual total cost with the higher accuracy and thereby calculates the annual actual use fee with the higher accuracy, compared with a simpler structure that calculates the actual cost based on the working status of only one typical network printer 30. The technique of the embodiment calculates the annual actual total cost from the actual results regarding a shorter time period than one year. This arrangement enables early evaluation of the validity of each printer contract without waiting for elapse of one year after the start of the printer contract. The information on the working status of each network printer 30 includes the numbers of printed sheets with regard to the respective paper sizes, the consumptions of the respective color toners, and the number of service engineer request times. The actual use fee significantly depends upon such data. The actual use fee calculated from these data accordingly has high accuracy. When the annual actual use fee is over the upper limit of the allowable range of the flat rate set in the printer contract, the message telling that the current printer contract is disadvantageous to the printer manufacturer is shown on the display 16. When the annual actual use fee is below the lower limit of the allowable range of the flat rate, on the other hand, the message telling that the current printer contract is disadvantageous to the user is shown in the display 16. These messages give the opportunity of reviewing the printer contract for a next one year. Compared with a simpler structure that simply gives an alarm, this arrangement enables the operator to instantly grasp the fact that the current printer contract is disadvantageous to the user or the dealer.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The embodiment discussed above regards print jobs. The technique of the invention is also applicable to expendable replacement jobs. In the case where an expendable replacement job is divided into multiple sections, a log may be stored on elapse of every preset time period.

The procedure of the above embodiment sets a state that a next log transmission timing comes before completion of a print job as the job division condition and switches over the log storage mode from the standard mode to the temporary mode when the job division condition is fulfilled. Another example may set an input of a job division instruction from the outside (for example, from a network computer) as the job division condition. In this case, the log storage mode is switched over from the standard mode to the temporary mode, in response to input of a job division instruction. This exerts the same effects as those discussed in the above embodiment.

In the embodiment discussed above, the procedure actually adopted for determination of whether a next log transmission timing comes before completion of a print job determines whether the expected end time calculated according to the contents of the print job comes to or after the next log transmission timing. Another applicable procedure may determine whether an execution start time of a print job is within a preset approaching range, which is close to the next log transmission timing. For example, the procedure may select a print job having the longest required time among all the print jobs given to the network printer 30 and determine whether the total of the current time and the longest required time exceeds the next log transmission time. This method enables easy determination of whether a next log transmission timing comes before completion of a print job and thereby desirably relieves the load of determination.

In the embodiment discussed above, color laser printers are used as the network printers 30. The color laser printers are, however, not restrictive at all, and the network printers 30 may be any of monochromatic laser printers, inkjet printers, and thermal transfer printers.

In the embodiment discussed above, the network printers 30 execute the log transmission method of the invention. Network computers that output printing instructions to printers may alternatively execute this log transmission method.

One possible modification may calculate a recommended flat rate for a next printer contact based on the actual use fee and show the recommended flat rate on the display 16 at step S490 or at step S500 in the flowchart of FIG. 8. The recommended flat rate may be used at the time of renewal of the printer contract. In the structure of the embodiment, the printer contract evaluation program starts, in response to the operator's input of a printer contract evaluation instruction. The printer contract evaluation program may be executed automatically at predetermined time intervals, for example, at every 3 months or at every 6 months, without the operator's input of a printer contract evaluation instruction. Another applicable modification may subtract the numbers of printed sheets and the consumptions of the color toners used in a failure of printing due to a trouble or malfunction of the printer from the total numbers of printed sheets and the total consumptions of the color toners at step S420 in the flowchart of FIG. 8. When the error time is longer than a generally expected time, the annual actual use fee may have some reduction according to the error time at step S450. In the structure of the above embodiment, the printer manufacturer functions as the dealer of the network system. The dealer is, however, not restricted to the printer manufacturer but may be a delivery agent, a distributor, or any other suitable business entity.

What is claimed is:

1. A log transmission device that transmits a log to a management server at every preset log transmission timing, said log transmission device comprising:

a log storage control module that stores a log generated after a previous log transmission timing into a log storage module;

a log transmission timing specification module that determines whether a current time is a log transmission timing; and a log transmission control module that, when said log transmission timing specification module determines that the current time is a log transmission timing, sends the log stored in said log storage module to the management server, wherein said log storage control module stores a log relating to a job into said log storage module on completion of the whole job when a next job transmission timing does not come before completion of the job, while dividing a job into multiple sections and storing a log relating to the divided job into said log storage module on completion of every one divisional section of the job when the next job transmission timing comes before completion of the whole job;

wherein said log storage control module stores a log relating to a print job into said log storage module on completion of the whole print job when a next job transmission timing does not come before completion of the print job, while storing a log relating to a print job into said log storage module on completion of every one page included in the print job when the next job transmission timing comes before completion of the print job;

wherein said log storage control module determines whether an expected end time of a print job estimated according to a paper size and a number of pages to be printed in the print job comes to or after the next log transmission timing, in order to determine whether the next job transmission timing comes before completion of the print job.

2. A log transmission device in accordance with claim 1, wherein said log storage control module determines whether an expected end time of a job estimated according to contents of the job comes to or after the next log transmission timing, in order to determine whether the next job transmission timing comes before completion of the job.

3. A log transmission device in accordance with claim 1, wherein said log storage control module determines whether an execution start time of a job is within a preset approaching range, which is close to the next log transmission timing, in order to determine whether the next job transmission timing comes before completion of the job.

4. A log transmission device in accordance with claim 1, wherein said log storage control module determines whether an expected end time of a print job estimated according to a volume of print data included in the print job comes to or after the next log transmission timing, in order to determine whether the next job transmission timing comes before completion of the print job.

5. A log transmission device in accordance with claim 1, said log transmission device being mounted on a network printer.

6. A log transmission device in accordance with claim 1, said log transmission device being mounted on a network computer that outputs a printing instruction to a printer.

7. A log transmission device in accordance with claim 1, wherein the log includes job identification information for identifying a job related to the log.

8. A log transmission device that transmits a log to a management server at every preset log transmission timing, said log transmission device comprising:

a log storage control module that stores a log generated after a previous log transmission timing into a log storage module;

a log transmission timing specification module that determines whether a current time is a log transmission timing; and a log transmission control module that, when said log transmission timing specification module determines that the current time is a log transmission timing, sends the log stored in said log storage module to the management server, wherein said log storage control module stores a log relating to a job into said log storage module on completion of the whole job when a next job transmission timing does not come before completion of the job, while dividing a job into multiple sections and storing a log relating to the divided job into said log storage module on completion of every one divisional section of the job when the next job transmission timing comes before completion of the whole job, wherein said log transmission control module sends the log to a management server, which evaluates validity of a contract made by a dealer with a registered user to permit the use of multiple apparatuses with said log transmission device mounted thereon for a predetermined time period at a flat rate.

* * * * *